(12) United States Patent
Littlefield et al.

(10) Patent No.: US 10,697,524 B2
(45) Date of Patent: Jun. 30, 2020

(54) MOTOR VEHICLE POWERTRAIN (71) Applicant: GM Global Technology Operations LLC, Detroit, MI (US)

(72) Inventors: Joseph R. Littlefield, Sterling Heights, MI (US); Alan G. Holmes, Clarkston, MI (US); Rebecca K. Risko Cattell, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 134 days.

(21) Appl. No.: 15/811,736

(22) Filed: Nov. 14, 2017

(65) Prior Publication Data

US 2019/0145500 A1 May 16, 2019

(51) Int. Cl.
*F16H 3/66* (2006.01)
*F16H 3/00* (2006.01)
*F16H 57/02* (2012.01)

(52) U.S. Cl.
CPC ....... *F16H 3/663* (2013.01); *F16H 2003/007* (2013.01); *F16H 2057/02043* (2013.01); *F16H 2200/2007* (2013.01); *F16H 2200/2046* (2013.01)

(58) Field of Classification Search
CPC .. B60K 6/365; B60K 6/48; F16G 3/66; F16H 3/724; F16H 2200/2007
See application file for complete search history.

(56) References Cited

U.S. PATENT DOCUMENTS

| | | | |
|---|---|---|---|
| 7,645,205 B2 | 1/2010 | Holmes | |
| 7,699,735 B2 * | 4/2010 | Conlon | B60K 6/365 475/5 |
| 8,075,435 B2 | 12/2011 | Si | |
| 2007/0021257 A1 | 1/2007 | Klemen et al. | |
| 2008/0103002 A1 | 5/2008 | Holmes | |
| 2010/0137091 A1 | 6/2010 | Park et al. | |
| 2013/0331216 A1 | 12/2013 | Tuckfield et al. | |
| 2014/0296013 A1 | 10/2014 | Hata et al. | |
| 2015/0292600 A1 * | 10/2015 | Ai | B60L 58/21 475/5 |
| 2017/0136870 A1 | 5/2017 | Littlefield et al. | |
| 2017/0320480 A1 | 11/2017 | Ye et al. | |
| 2018/0141429 A1 | 5/2018 | Cho et al. | |

* cited by examiner

*Primary Examiner* — Patrick H Mackey
(74) *Attorney, Agent, or Firm* — Quinn IP Law (57) ABSTRACT

A vehicle powertrain includes first and second power sources and a transmission assembly having first and second input members and an output member. The transmission assembly also includes a first multiple node planetary gear-set connected to both input members and a second multiple node planetary gear-set connected to the output member. The transmission assembly additionally includes a transmission housing retaining the first and second gear-sets. Furthermore, the transmission assembly includes a first torque-transmitting device for connecting one second gear-set node to the transmission housing and a second torque-transmitting device for connecting one first gear-set node to one second gear-set node. One first gear-set node is directly and continuously connected to one second gear-set node. The first and second power sources are connected to the first gear-set, and the first power source is connected to the first gear-set node not directly and continuously connected to the second gear-set.

16 Claims, 10 Drawing Sheets

MOTOR VEHICLE POWERTRAIN

INTRODUCTION

The disclosure relates to electric and hybrid-electric powertrains for a motor vehicle.

Modern motor vehicles are typically configured as either two- or all-wheel-drive. Either type of a vehicle may employ a powertrain with a single power source, such as an internal combustion engine or an electric motor, used to propel the vehicle, or a hybrid powertrain, where two or more distinct power sources, such as an internal combustion engine and an electric motor, are used to accomplish the same task. Vehicle drive wheels may receive power from each such combination of power sources. As such, a representative powertrain may be used to power a two-wheel-drive or an all-wheel-drive vehicle.

An all-wheel-drive vehicle using a hybrid powertrain may be configured as an axle-split vehicle. In such an all-wheel-drive hybrid vehicle, one or more power sources, such as an internal combustion engine alone or with an electric motor, on one axle, and another power source on another axle, may be set up to independently power the respective vehicle axles to generate on-demand all-wheel-drive propulsion. In such a vehicle, an engine with an electric motor connected to the same axle may be configured to channel their respective torque outputs through a transmission assembly to effectively provide a power-split electro-mechanical hybrid powertrain.

SUMMARY

A powertrain for a motor vehicle includes a first power source configured to generate a first torque output, a second power source configured to generate a second torque output, and a transmission assembly. The transmission assembly includes a first input member, a second input member, and an output member. The transmission assembly also includes a first planetary gear-set having a plurality of nodes and operatively connected to each of the first and second input members, and a second planetary gear-set having plurality of nodes and operatively connected to the output member. The transmission assembly additionally includes a transmission housing configured to retain the first and second planetary gear-sets. Furthermore, the transmission assembly includes a first torque-transmitting device configured to selectively connect or ground one node of the second planetary gear-set to the transmission housing and a second torque-transmitting device configured to selectively connect one node of the first planetary gear-set to one node of the second planetary gear-set. One node of the first planetary gear-set is directly and continuously connected to one node of the second planetary gear-set. Each of the first power source and the second power source is operatively connected to the first planetary gear-set, and the first power source is operatively connected to the node of the first planetary gear-set that is not directly and continuously connected to one of the plurality of nodes of the second planetary gear-set.

The second torque-transmitting device may be configured to selectively connect the second power source to the node of the second planetary gear-set selectively connected to the transmission housing via the first torque-transmitting device.

The second power source may be operatively connected to one of the plurality of nodes of the first planetary gear-set that is not directly and continuously connected to one of the plurality of nodes of the second planetary gear-set.

The first and the second power sources may be directly and continuously connected to separate nodes of the first planetary gear-set. In such an embodiment, the transmission assembly may also include a third torque-transmitting device configured to selectively connect two nodes of the first planetary gear-set individually and continuously connected to the respective first and the second power sources.

The transmission assembly may also include a fourth torque-transmitting device configured to selectively connect the second power source to the first planetary gear-set.

The transmission assembly may also include a fifth torque-transmitting device configured to selectively connect the first power source to the directly and continuously connected nodes of the first planetary gear-set and the second planetary gear-set.

The second planetary gear-set may be configured as a Ravigneaux planetary gear-set. In such an embodiment, the transmission assembly may also include a sixth torque-transmitting device configured to selectively ground to the transmission housing a node of the Ravigneaux second planetary gear-set not selectively connected to the transmission housing by the first torque-transmitting device.

The first planetary gear-set may be configured as a Ravigneaux planetary gear-set. In such an embodiment, the transmission assembly may also include a seventh torque-transmitting device configured to selectively connect two separate nodes of the Ravigneaux first planetary gear-set not operatively connected to either the first power source or the second power source.

The transmission assembly may also include an eighth torque-transmitting device configured to selectively ground to the transmission housing a node of the Ravigneaux first planetary gear-set not operatively connected to either the first power source or the second power source and not directly and continuously connected to one of the plurality of nodes of the second planetary gear-set.

The first power source may be an electric motor-generator, while the second power source may be an internal combustion engine.

The motor vehicle may be arranged along a longitudinal vehicle axis and may include a final drive assembly. Each of the first power source, second power source, and the final drive assembly may be arranged along the longitudinal vehicle axis or along respective axes arranged transverse to the longitudinal vehicle axis.

A motor vehicle employing such a powertrain operatively connected via a final drive assembly to first and second road wheels is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
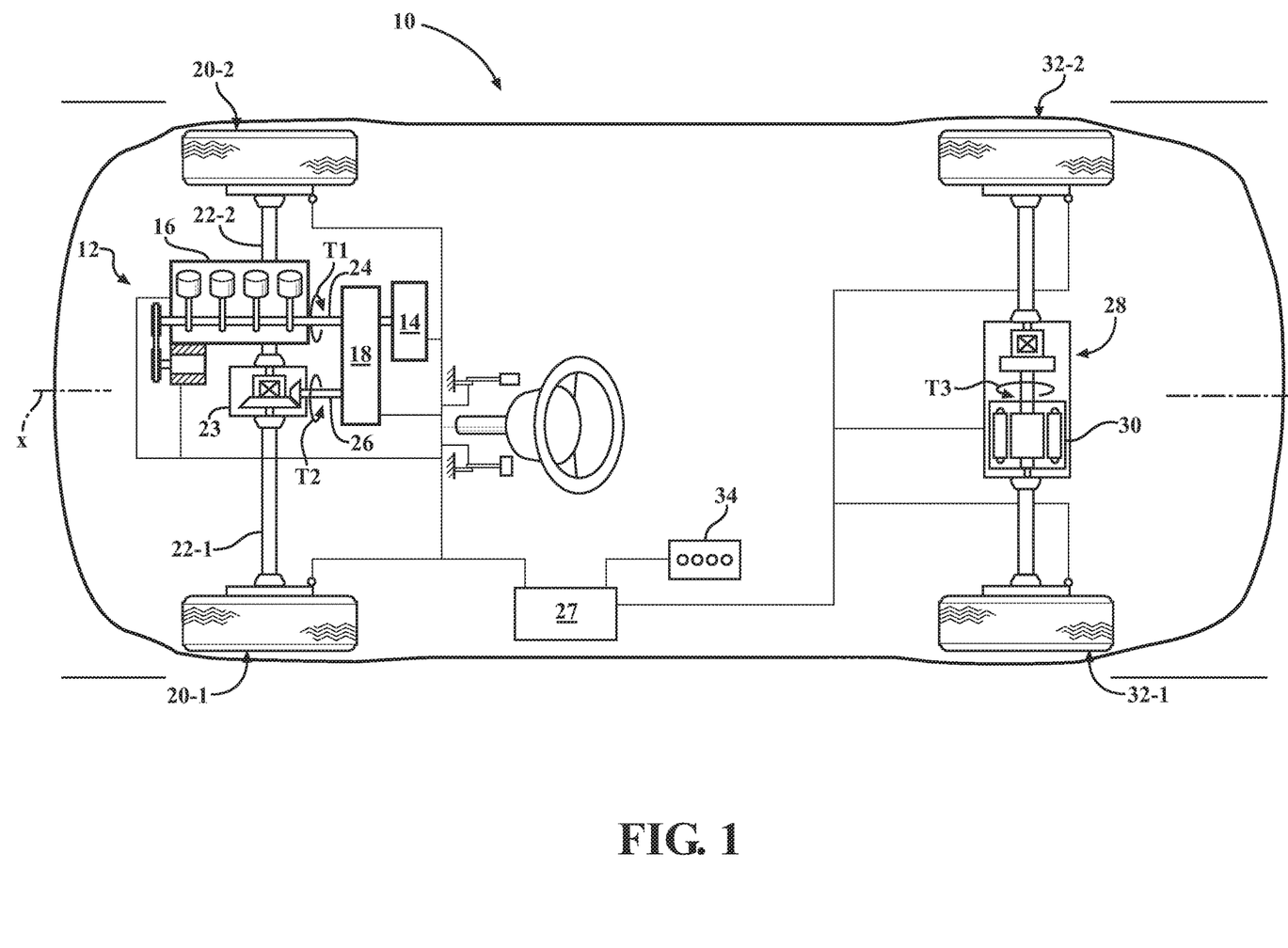
FIG. 1 is a schematic illustration of a vehicle employing a longitudinally oriented hybrid electric powertrain that includes a powertrain including two independent power sources coupled to a transmission assembly, according to the disclosure.

Referring to the drawings in which like elements are identified with identical numerals throughout, FIG. 1 illustrates a vehicle 10 having independent first and second power sources that may be operatively connected to respective sets of driven wheels in order to provide on-demand all-wheel-drive propulsion. The vehicle 10 may include, but not be limited to, a commercial vehicle, industrial vehicle, passenger vehicle, aircraft, watercraft, train or the like. As shown in FIG. 1, the vehicle 10 is generally arranged along a longitudinal vehicle axis X. The vehicle 10 includes a first drive axle 12, which may be one of a plurality of drive axles employed in the vehicle. The drive axle 12 includes a powertrain 13. The powertrain 13 includes a first power source 14, which may be an electric motor-generator, as shown. The powertrain 13 also includes a second power source 16, which may be an internal combustion engine, as shown, and thus be configured as a power-split hybrid-electric drive axle.

In the powertrain 13 with the first and second power sources 14, 16 configured as the respective first electric motor-generator and the internal combustion engine, the drive axle 12 is configured as a power-split hybrid-electric drive axle, and the powertrain 13 is a hybrid powertrain. The drive axle 12 also includes a transmission assembly 18, along with a first set of wheels, including a first or left-side road wheel 20-1 operatively connected to transmission assembly via a first axle-shaft 22-1 and a second or right-side road wheel 20-2 operatively connected to the transmission assembly via a second axle-shaft 22-2. The drive axle 12 also includes a final drive assembly 23 operatively connected to and configured to distribute torque transmitted by the transmission assembly 18 to each of the first and second road wheels 20-1, 20-2. Each of the first power source 14, second power source 16, and the final drive assembly 23 may be arranged along the longitudinal vehicle axis X (shown in FIG. 1) or along respective axes Y1, Y2, and Y3 (shown in FIG. 2) arranged transverse to the longitudinal vehicle axis X.

Figure 2:
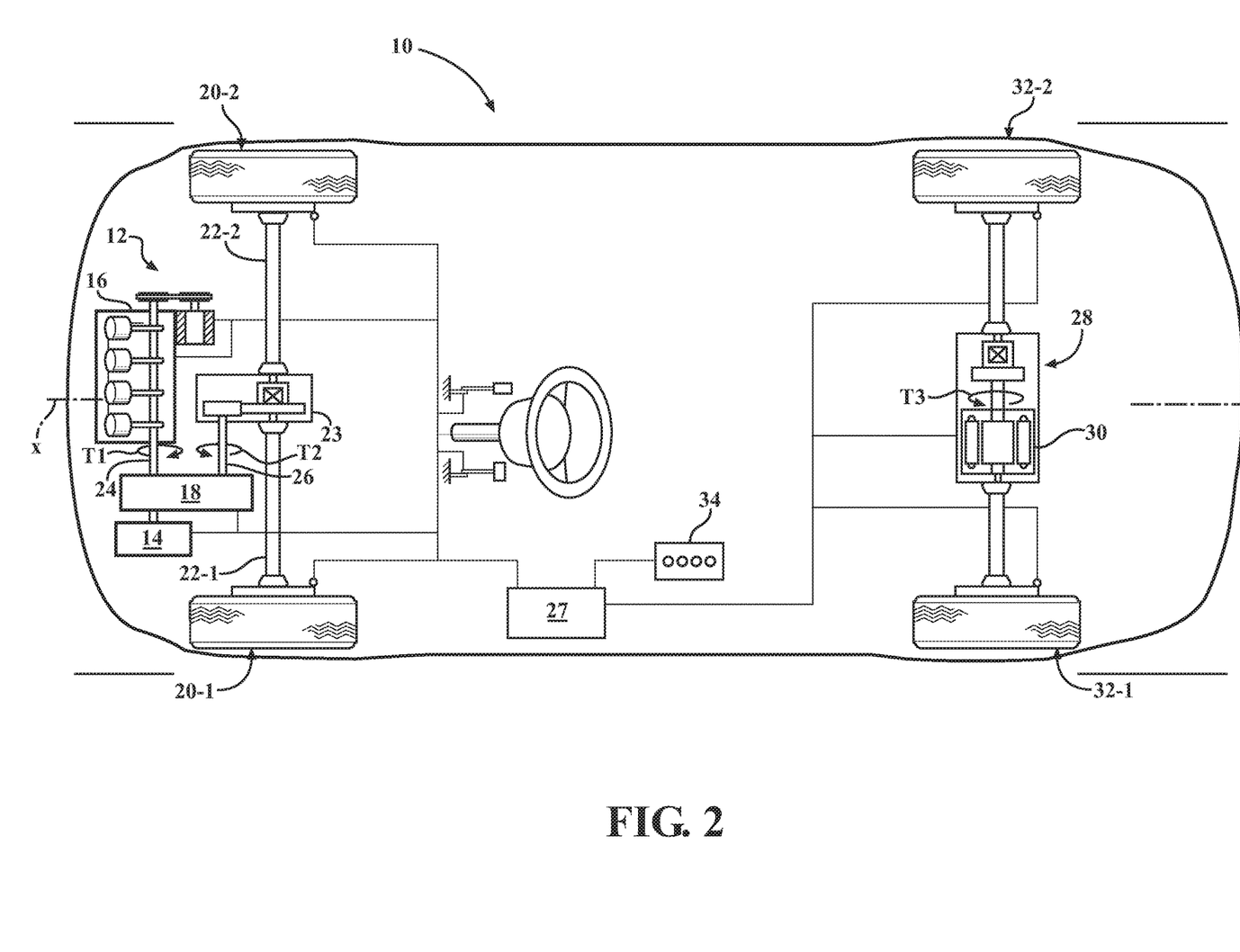
FIG. 2 is a schematic illustration of a vehicle employing a transversely oriented hybrid electric powertrain that includes a powertrain including two independent power sources coupled to a transmission assembly, according to the disclosure.

The first power source 14 and the second power source 16 are configured to drive the vehicle 10 through the transmission assembly 18, either together or separately, via the final drive assembly 23 and the first and second wheels 20-1, 20-2. Specifically, the first power source 14 is configured to generate a first torque output T1, while the second power source 16 is configured to generate a second torque output T2, each for driving the vehicle through the transmission assembly 18. The transmission assembly 18 generally includes a first transmission input member 24-1 configured to receive torque of the first and second power sources 14, 16, and a transmission output member 26 configured to transmit torque from the transmission assembly to the first and second axle-shafts 22-1, 22-2 via a final drive assembly 23. The transmission assembly 18 includes a plurality of torque-transmitting devices, specifically a first torque-transmitting device 42-1 and a second torque-transmitting device 42-2, as described in detail below. Additionally, the plurality of torque-transmitting devices may include third, fourth, fifth, and sixth torque-transmitting devices 42-3, 42-4, 42-5, 42-6, as is also described below.

As shown in FIGS. 1 and 2, the vehicle 10 additionally includes a second drive axle 28. The second drive axle 28 is operatively independent from the first drive axle 12. The second drive axle 28 includes a third power source 30, shown as a second electric motor-generator that is configured to generate a third torque output T3 for driving the vehicle 10 via a second set of wheels, which includes a first or left-side road wheel 32-1 and a second or right-side road wheel 32-2. Each of the first, second, and third power sources 14, 16, 30 configured as respective electric motor-generators receives its electrical energy from an energy storage device 34. Accordingly, the vehicle 10 may be powered by the respective first and second vehicle drive axles 12 and 28 independently or in combination to generate on-demand front, rear, or all-wheel-drive propulsion. Additionally, the first and second drive axles 12, 28 may be arranged such that the first drive axle is positioned at the front of the vehicle 10 and the second drive axle is positioned at the rear of the vehicle, or vice versa.

Specific embodiments of the first drive axle 12 with the powertrain 13 using the transmission assembly 18 are represented in lever diagram form in FIGS. 3-9. A lever diagram is a schematic representation of the components of a mechanical device such as an automatic transmission. Each individual lever represents a planetary gear-set or an external gear-set. In the planetary gear-set levers, the three basic mechanical components of the planetary gear are each represented by a node. Therefore, a single planetary gear-set lever contains three nodes: one for the sun gear member, one for the planet gear carrier member, and one for the ring gear member. The relative length between the nodes of each planetary gear-set lever may be used to represent the ring-to-sun ratio of each respective gear-set. These lever ratios, in turn, are used to vary the gear ratios of the transmission in order to achieve appropriate ratios and ratio progression. Mechanical couplings or interconnections between the nodes of the various planetary gear-sets are illustrated by thin, solid lines and torque-transmitting devices such as clutches and brakes are presented as interleaved fingers. If the subject torque-transmitting device is a brake, one set of the fingers is grounded. Further explanation of the format, purpose and use of lever diagrams may be found in SAE Paper 810102, authored by Benford, Howard and Leising, Maurice, "The Lever Analogy: A New Tool in Transmission Analysis", 1981, which is hereby fully incorporated by reference.

Figure 7:
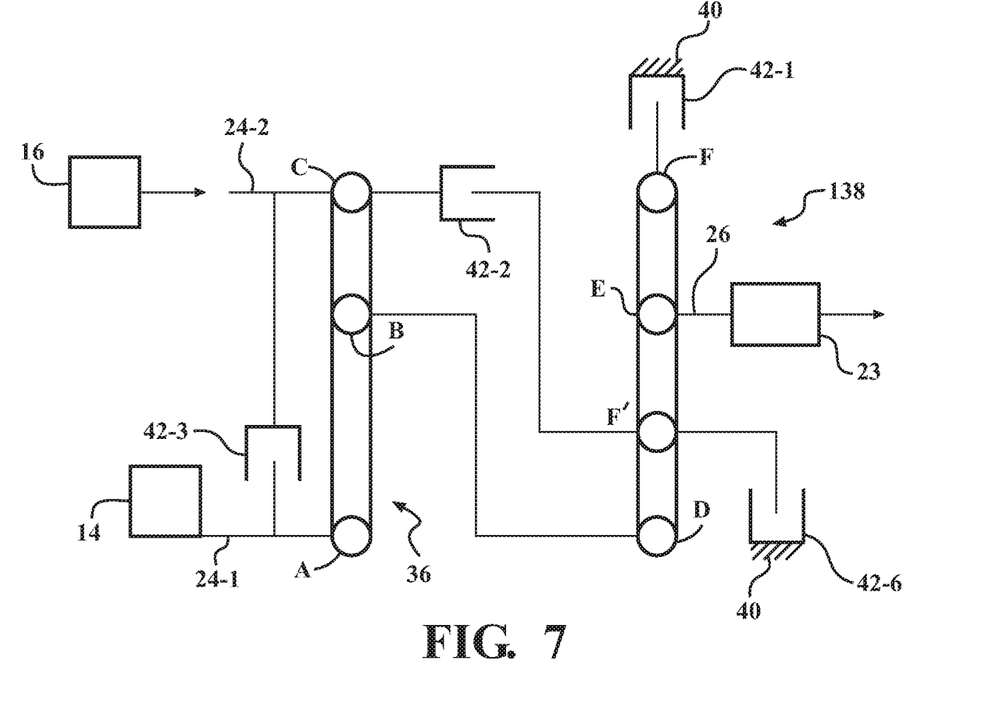
FIG. 7 is a schematic lever diagram illustration of a yet another embodiment of the powertrain shown in FIG. 1 or FIG. 2.
Figure 8:
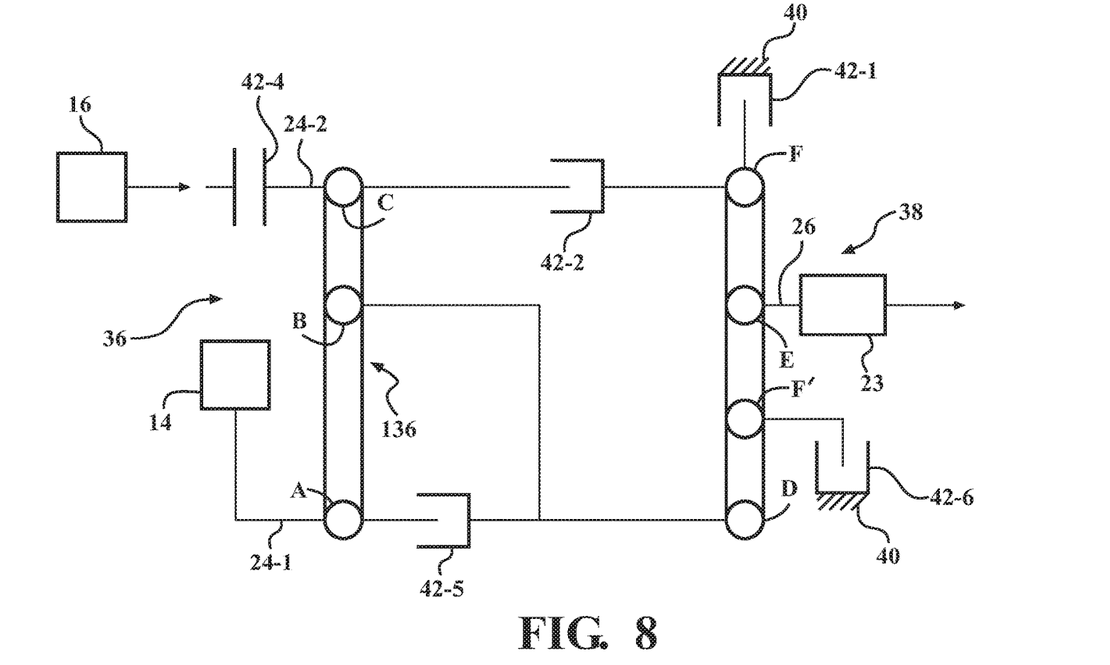
FIG. 8 is a schematic lever diagram illustration of a yet another embodiment of the powertrain shown in FIG. 1 or FIG. 2.
Figure 9:
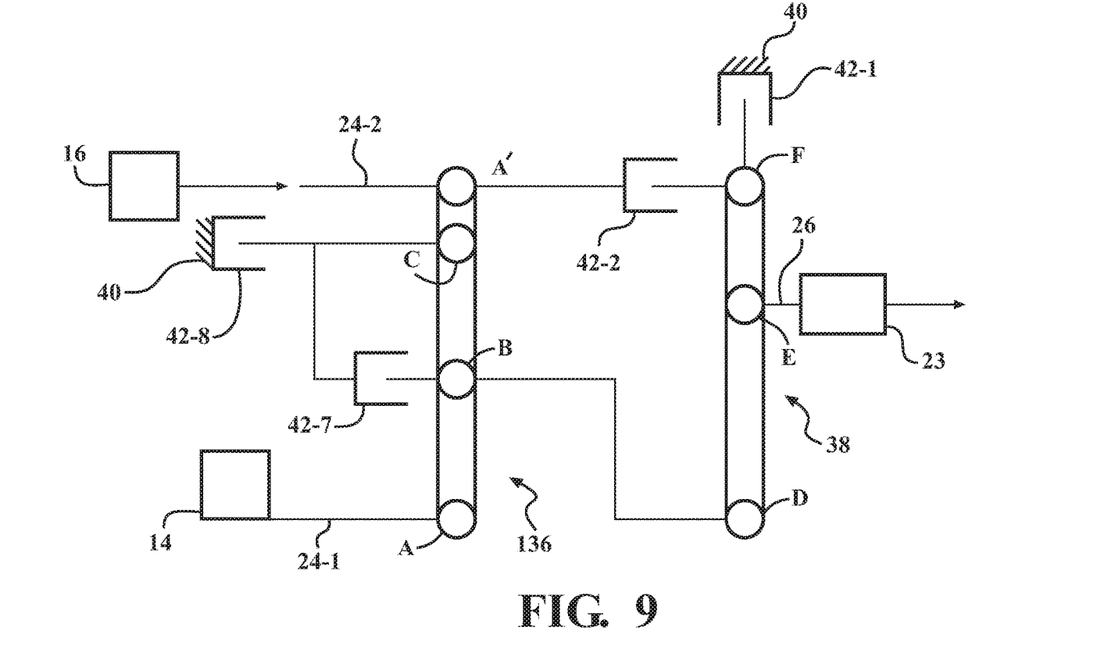
FIG. 9 is a schematic lever diagram illustration of a yet another embodiment of the powertrain shown in FIG. 1 or FIG. 2.

The transmission assembly 18 includes a first planetary gear-set 36 having a plurality of nodes, shown in FIGS. 3-8 as a first node A, a second node B, and a third node C. The nodes A, B, and C represent a first, second and third members of the planetary gear-set 36, such as a ring gear member, a carrier member rotatably supporting a plurality of pinion gears, and a sun gear member, although not necessarily in that order. An alternative embodiment of the first planetary gear-set 36 is a Ravigneaux gear-set having four nodes, specifically nodes A, A', B, and C, as shown in FIG. 9. The nodes A, A', B, and C represent a first, second, third, and fourth members of the planetary gear-set 136, such as a first and second sun gear members, a carrier member, and a ring gear member, although not necessarily in that order.

Figure 6:
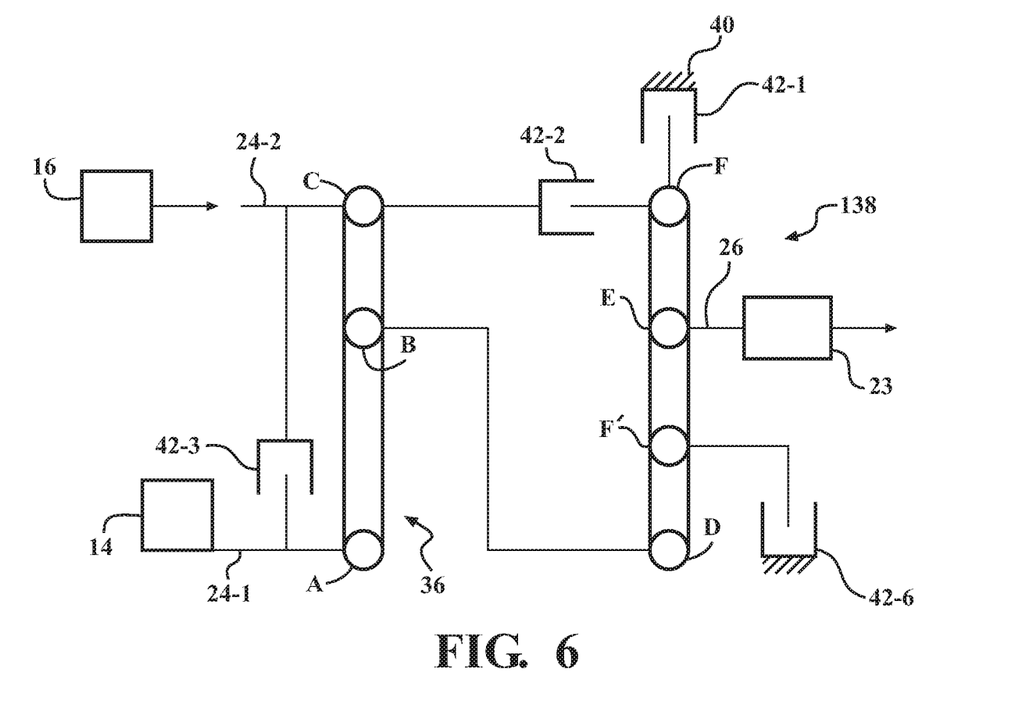
FIG. 6 is a schematic lever diagram illustration of a yet another embodiment of the powertrain shown in FIG. 1 or FIG. 2.

Each of the above-discussed embodiments of the first planetary gear-set 36 is operatively and continuously connected to the first transmission input member 24-1. The transmission assembly 18 also includes a second planetary gear-set 38 having a plurality of nodes shown in FIGS. 3-5, 7, and 9 as a first node D, a second node E, and a third node F. An alternative embodiment of the second planetary gear-set 38 is a Ravigneaux gear-set having four nodes, specifically nodes D, E, F, and F', as shown in FIGS. 6 and 7. Each of the above-discussed embodiments of the second planetary gear-set 38 is operatively and continuously connected to the transmission output member 26.

In general, the Ravigneaux planetary gear-set is constructed from two meshed gear pairs—a ring gear member/planetary gear pair and a planetary gear/sun gear pair. A Ravigneaux planetary gear-set may have two sun gears members—a large sun gear and a small sun gear. Alternatively, a Ravigneaux planetary gear-set may have two separate ring gears. A Ravigneaux planetary gear-set has a single planet carrier member holding two sets of planetary gears—inner planetary gears and outer planetary gears. The planet carrier member is a single sub-assembly that supports the inner and outer planetary gears on distinct, respective inner and outer pitch circles. The two sets of planetary gears are in mesh and therefore co-rotate with a fixed gear ratio with respect to each other, but independently of the carrier. In the embodiment employing two sun gear members, the inner planetary gears couple with the small sun gear and co-rotate at a fixed gear ratio with respect thereto, while the outer planetary gears couple with the large sun gear and co-rotate with a fixed gear ratio with respect thereto. In the embodiment employing two ring gear members, one ring gear member may mesh with the outer planetary gears and co-rotate with the subject outer planetary gears in a fixed gear ratio, while another ring gear member may mesh with the inner planetary gears and co-rotate with the subject inner planetary gears in a fixed gear ratio.

For example, in a particular embodiment of the Ravigneaux first gear-set 36 shown in FIG. 9, the nodes A, A', B, and C represent a first, second, third, and fourth members—specifically a first sun gear member 336-1, a second sun gear member 336-1', a carrier member 336-2, and a ring gear member 336-3, respectively. Furthermore, in a particular embodiment of the Ravigneaux second gear-set 38 shown in FIGS. 6 and 7, the nodes D, E, F, and F' represent a first, second, third, and fourth members—specifically a sun gear member 238-1, a carrier member 238-2, a first ring gear member 238-3, and, a second ring gear member 238-3', respectively.

The transmission assembly 18 additionally includes a transmission housing 40 configured to encase and retain the first and second planetary gear-sets 36, 38. The transmission housing 40 may be mounted to each of and in between the first and second power sources 14, 16. As noted above, the transmission assembly 18 also includes the first torque-transmitting device 42-1. The first torque-transmitting device 42-1 is configured to selectively connect or ground one of the plurality of nodes D, E, F of the second planetary gear-set 38 to the transmission housing 40. Specifically, as shown in the embodiments of FIGS. 3-9, the first torque-transmitting device 42-1 may be configured to selectively connect or ground the node F to the transmission housing 40.

Figure 3:
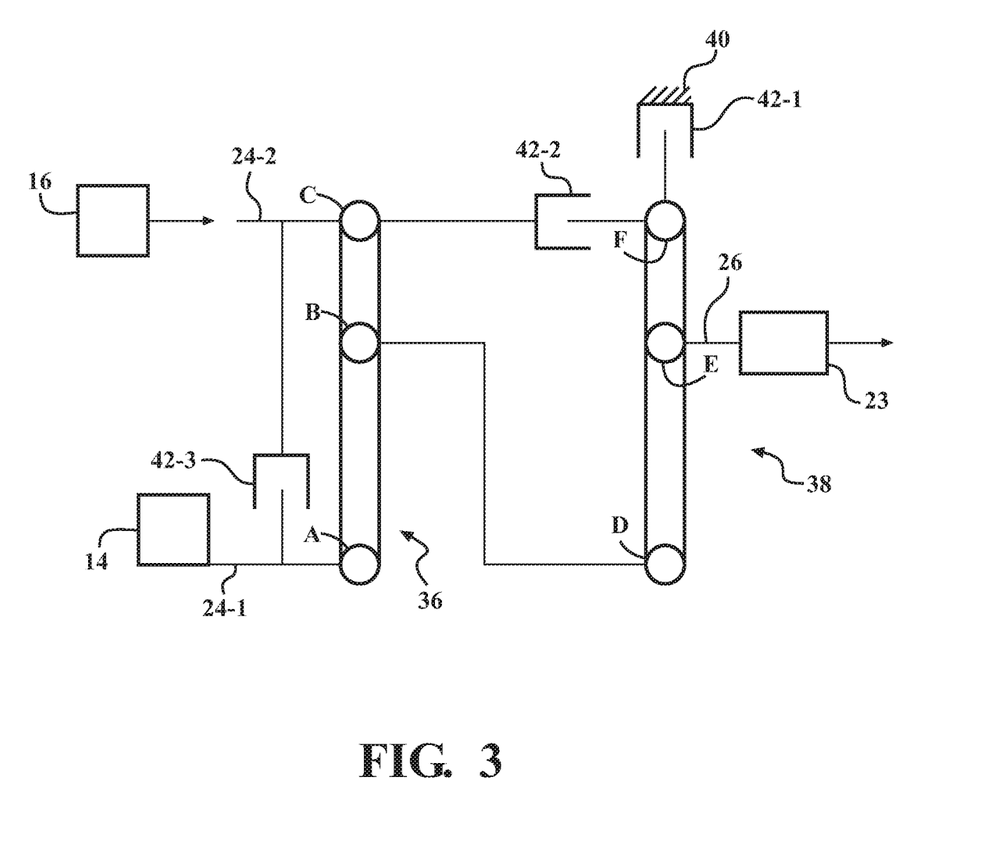
FIG. 3 is a schematic lever diagram illustration of an embodiment of the powertrain shown in FIG. 1 or FIG. 2.
Figures 4, 5:
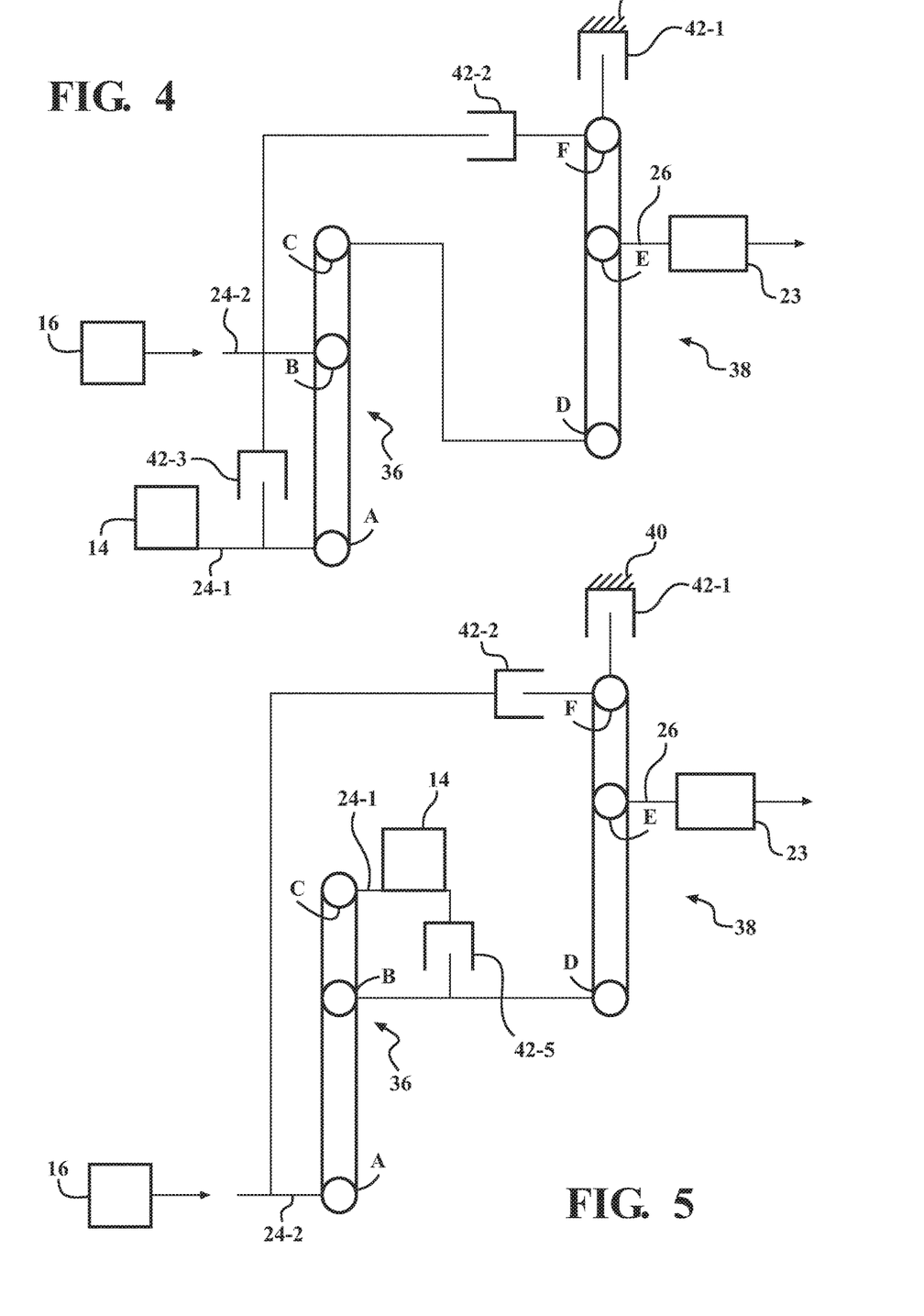
FIG. 4 is a schematic lever diagram illustration of a yet another embodiment of the powertrain shown in FIG. 1 or FIG. 2.
FIG. 5 is a schematic lever diagram illustration of a yet another embodiment of the powertrain shown in FIG. 1 or FIG. 2.

As noted above, the transmission assembly 18 further includes the second torque-transmitting device 42-2. The second torque-transmitting device 42-2 is configured to selectively connect one of the plurality of nodes A, B, C of the first planetary gear-set 36 to one of the plurality of nodes D, E, F of the second planetary gear-set 38. Specifically, as shown in the embodiments of FIGS. 3, 6, and 8, the second torque-transmitting device 42-2 may be configured to selectively connect the node C to the node F; as shown in the embodiment of FIG. 4, the second torque-transmitting device 42-2 may be configured to selectively connect the node B to the node F; as shown in FIG. 5, the second torque-transmitting device 42-2 may be configured to selectively connect the node A to the node F. Additionally, in the embodiment of FIG. 9 depicting the Ravigneaux first planetary gear-set 136, the second torque-transmitting device 42-2 may be configured to selectively connect the node A' to the node F. Furthermore, in the embodiment of FIG. 7 depicting the Ravigneaux second planetary gear-set 138, the second torque-transmitting device 42-2 may be configured to selectively connect the node C to the node F'.

One of the plurality of nodes A, B, C of the first planetary gear-set 36 is directly and continuously connected to one of the plurality of nodes D, E, F of the second planetary gear-set 38. Specifically, as shown in the embodiment of FIG. 3, the second node B may be directly and continuously connected to the first node D; as shown in the embodiment of FIG. 4, the third node C may be directly and continuously connected to the first node D; and as shown in the embodiments of FIG. 5-9, the second node B may be directly and continuously connected to the first node D. The first power source 14 is operatively connected to one of the plurality of nodes A, B, C of the first planetary gear-set 36 that is not directly and continuously connected to one of the plurality of nodes D, E, F of the second planetary gear-set 38. The powertrain 13 also includes a second input member 24-2, such that the second power source 16 is then operatively connected via the second input member to one of the plurality of nodes A, B, C of the first planetary gear-set 36.

As shown in the embodiments of FIGS. 3-9, the second power source 16 may be operatively connected to one of the plurality of nodes A, B, C of the first planetary gear-set 36 that is not directly and continuously connected to one of the plurality of nodes D, E, F of the second planetary gear-set 38. Specifically, as shown in FIGS. 3, 6, 7, and 8, the second power source 16 may be continuously connected via the second input member 24-2 to the node C. Additionally, as shown in the embodiment of FIG. 4, the second power source 16 may be continuously connected via the second input member 24-2 to the node B, or, as shown in the embodiment of FIG. 5, the second power source 16 may be continuously connected via the second input member 24-2 to the node A. In the embodiments of the power-split hybrid-electric drive axle 12 shown in FIGS. 3-7 and 8, the first and the second power sources 14, 16 may be directly and continuously connected to separate nodes of the first planetary gear-set 36. Furthermore, in the embodiments depicted in FIGS. 3, 4, 6, and 7, the transmission assembly 18 additionally includes a third torque-transmitting device 42-3. As shown, the third torque-transmitting device 42-3 is configured to selectively connect two nodes of the first planetary gear-set 36 that are directly, individually, and continuously connected to the respective first and second power sources 14, 16. Specifically, in FIGS. 3, 6, and 7 the third torque-transmitting device 42-3 selectively connects the node A to the node C. Alternatively, as shown in FIG. 4, the third torque-transmitting device 42-3 selectively connects the node A to the node B.

In a yet another embodiment, the transmission 18 may include a fourth torque-transmitting device 42-4 configured to selectively connect the second power source 16 to the first planetary gear-set 36. Specifically, as shown in FIG. 8, the fourth torque-transmitting device 42-4 may be configured to selectively connect the second power source 16 to the node C. As shown in FIGS. 5 and 8, an embodiment of the power-split hybrid-electric drive axle 12 may additionally include a fifth torque-transmitting device 42-5. The fifth torque-transmitting device 42-5 is configured to selectively connect the first power source 14 to the directly and continuously connected nodes of the first planetary gear-set 36 and the second planetary gear-set 38. Specifically, the fifth torque-transmitting device 42-5 may be configured to selectively connect the first power source 14 to the directly and continuously interconnected nodes B and D.

As shown in FIGS. 6 and 8, an embodiment of the power-split hybrid-electric drive axle 12 may additionally include a sixth torque-transmitting device 42-6. The sixth torque-transmitting device 42-6 is configured to selectively ground to the transmission housing 40 a node of the Ravigneaux second planetary gear-set 138 not selectively connected to the transmission housing by the first torque-transmitting device 42-1. Specifically, the sixth torque-transmitting device 42-6 may be configured to selectively ground the node F' of the Ravigneaux second planetary gear-set 138 to the transmission housing 40.

As shown in FIG. 9, an embodiment of the power-split hybrid-electric drive axle 12 may additionally include a seventh torque-transmitting device 42-7. The seventh torque-transmitting device 42-7 is configured to selectively connect two separate nodes of the Ravigneaux first planetary gear-set 136 not operatively connected to either the first power source 14 or the second power source 16. Specifically, the seventh torque-transmitting device 42-7 may be configured to selectively connect the node B to the node C of the Ravigneaux first planetary gear-set 136. As additionally shown in FIG. 9, the power-split hybrid-electric drive axle 12 may further include an eighth torque-transmitting device 42-8. The eighth torque-transmitting device 42-8 is configured to selectively ground to the transmission housing 40 a node of the Ravigneaux first planetary gear-set 136 not operatively connected to either the first power source 14 or the second power source 16. Furthermore, the eighth torque-transmitting device 42-8 is configured to selectively ground to the transmission housing 40 a node of the Ravigneaux first planetary gear-set 136 not directly and continuously connected to one of the plurality of nodes of the second planetary gear-set 138. Specifically, the eighth torque-transmitting device 42-8 may be configured to selectively ground the node C of the Ravigneaux first planetary gear-set 136 to the transmission housing 40.

In each of the above embodiments, the third, fifth, and seventh torque-transmitting devices 42-3, 42-5, 42-7 are configured to operate as a lock-up clutches to enable fixed gear operation in the transmission assembly 18. The sixth and eighth torque-transmitting devices 42-6, 42-8 are configured to operate as reverse clutches to enable the output member 26 to rotate in an opposite direction as compared to the direction of rotation of the second power source 16.

Figure 3A:
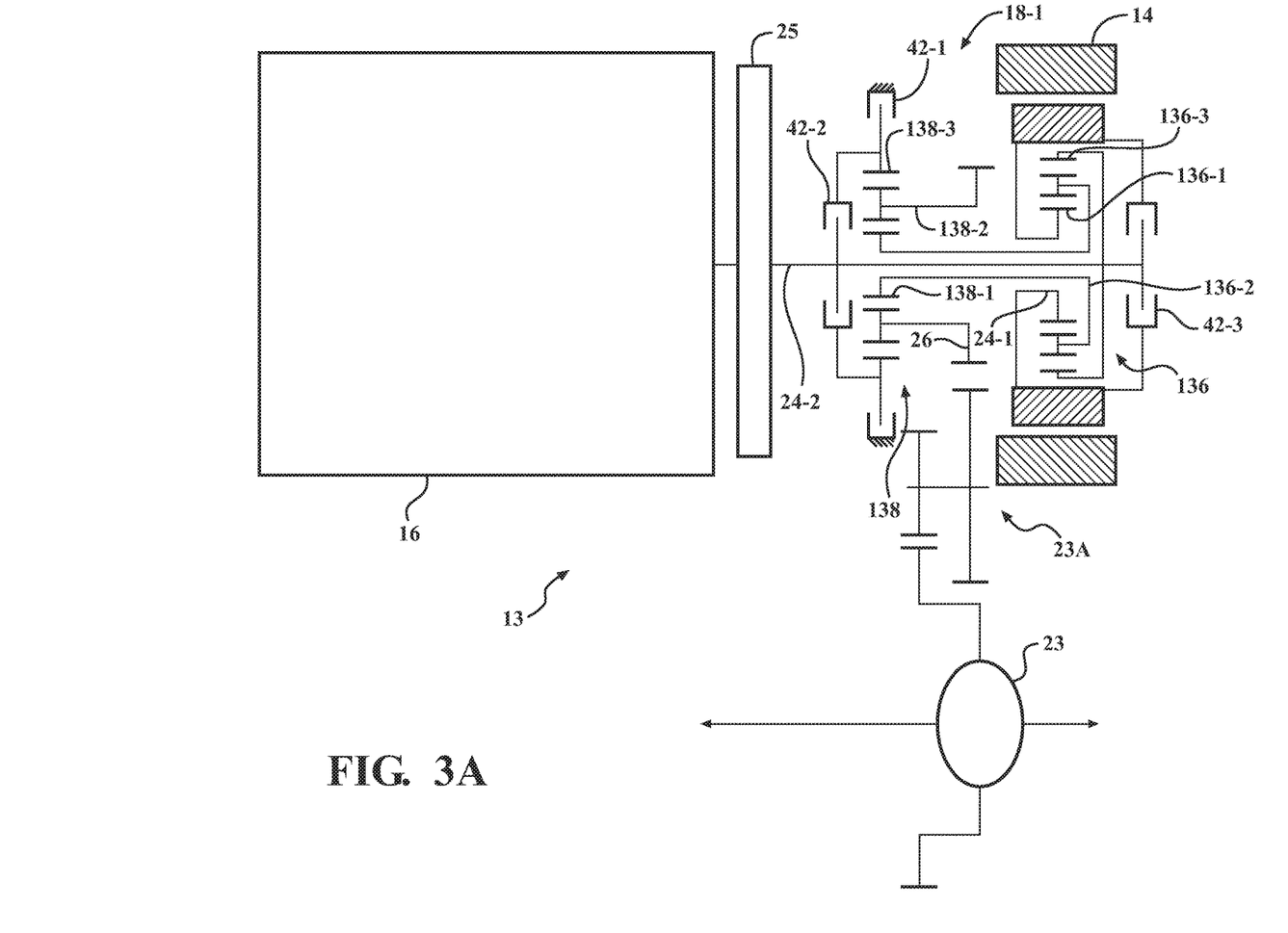
FIG. 3A is an exemplary schematic stick diagram illustration of the powertrain corresponding to the lever diagram of FIG. 3.

In FIG. 3A, the powertrain 13 is represented by a schematic stick diagram that depicts specific planetary gear-set connections corresponding to and reflected by the lever diagram of FIG. 3. The exemplary embodiment of the transmission assembly 18 represented by the lever diagram in FIG. 3 is identified in FIG. 3A with a numeral 18-1. The transmission assembly embodiment 18-1 has a specific embodiment of the first planetary gear-set 36, identified with a numeral 136, and a specific embodiment of the second planetary gear-set 38, identified with a numeral 138. The first planetary gear-set 136 employs a sun gear member 136-1 which is circumscribed by a ring gear member 136-3, and a carrier member 136-2 rotatably supporting a plurality of pinion gears that meshingly engage both the sun gear member 136-1 and the ring gear member 136-3. The second planetary gear-set 138 employs a sun gear member 138-1 which is circumscribed by a ring gear member 138-3, and a carrier member 138-2 rotatably supporting a set of pinion gears. The set of pinion gears meshingly engages the sun gear member 138-1 and the ring gear member 138-3.

The exemplary transmission assembly embodiment 18-1 is configured such that the first power source 14, which is shown as an electric motor-generator is continuously connected via the first input member 24-1 to the node A, which is specifically shown as the sun gear member 136-1. The node B, which is specifically shown as the carrier member 136-2, is continuously connected to the node D, which is specifically shown as the sun gear member 138-1. The node C, which is specifically shown as the ring gear member 136-3, is selectively connected to the node F, which is specifically shown as the ring gear member 138-3, via the second torque-transmitting device 42-2. The ring gear member 138-3 at the node F is also selectively connected via the first torque-transmitting device 42-1 to the transmission housing 40. The second power source 16, which is shown as an internal combustion engine, is continuously connected via the second input member 24-2 and a torsional damper 25 to the ring gear member 136-3 at the node C. The node C is also selectively connected via the third torque-transmitting device 42-3 to the node A. The node E, which is specifically shown as the carrier member 138-2, is continuously connected to the final drive assembly 23 via the transmission output member 26 and through the torque transfer mechanism 23A.

Figure 6A:
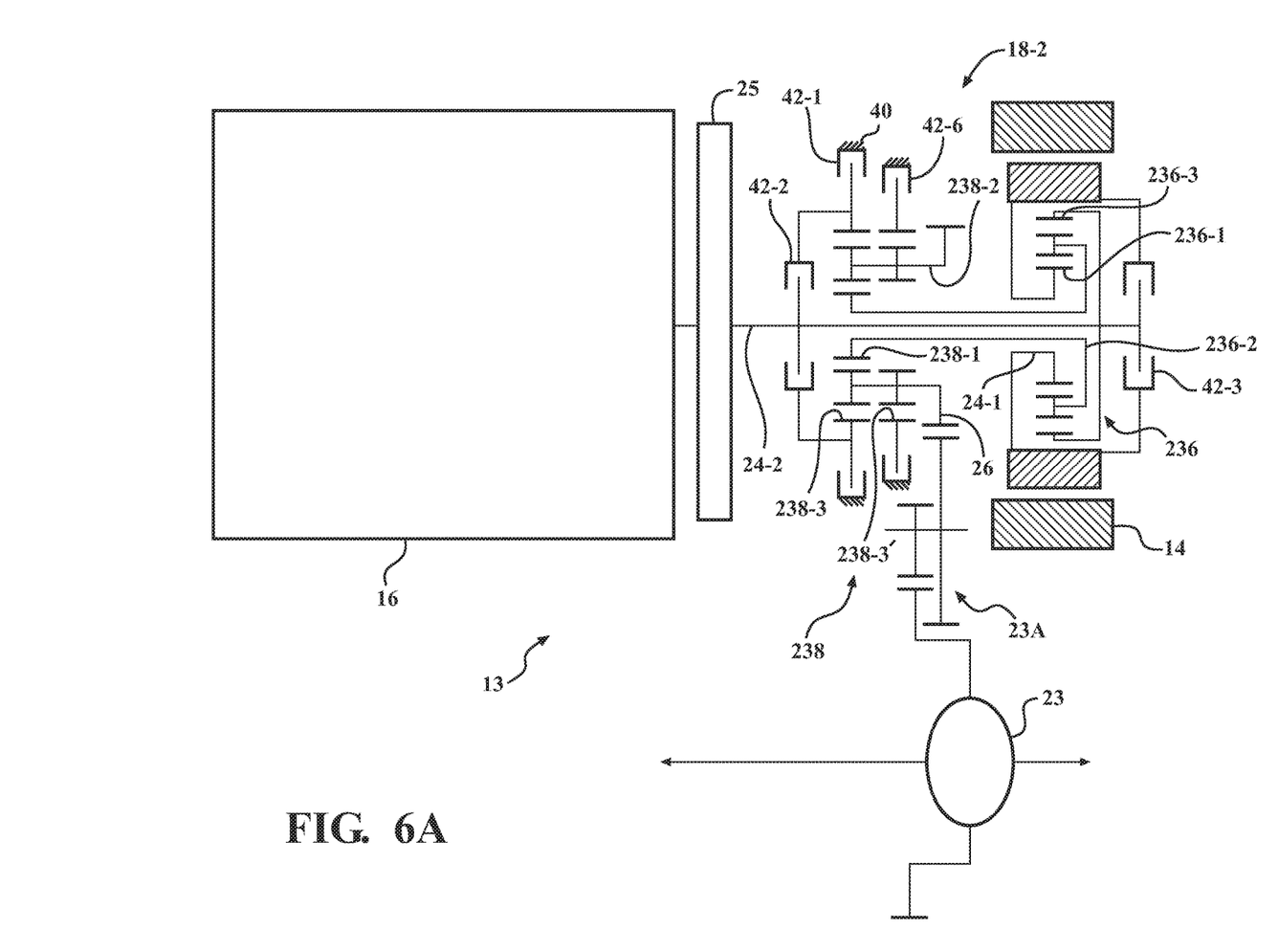
FIG. 6A is an exemplary schematic stick diagram illustration of the powertrain corresponding to the lever diagram of FIG. 6.

In FIG. 6A, the powertrain 13 is represented by a schematic stick diagram that depicts specific planetary gear-set connections corresponding to and reflected by the lever diagram of FIG. 6. The exemplary embodiment of the transmission assembly 18 represented by the lever diagram in FIG. 6 is identified in FIG. 6A with a numeral 18-2. The transmission assembly embodiment 18-2 has a specific embodiment of the first planetary gear-set 36, identified with a numeral 236, and a specific embodiment of the Ravigneaux second planetary gear-set 38, identified with a numeral 238. The first planetary gear-set 236 employs a sun gear member 236-1 which is circumscribed by a ring gear member 236-3, and a carrier member 236-2 rotatably supporting a plurality of pinion gears that meshingly engage both the sun gear member 236-1 and the ring gear member

236-3. The second planetary gear-set 238 employs a sun gear member 238-1 which is circumscribed by a first ring gear member 238-3 and a second ring gear member 238-3', and a carrier member 238-2 rotatably supporting two sets of pinion gears. One of the sets of pinion gears meshingly engages the sun gear member 238-1 and the first ring gear member 238-3, while the other set of pinion gears meshingly engages the second ring gear member 238-3'.

The exemplary transmission assembly embodiment 18-2 is configured such that the first power source 14, which is shown as an electric motor-generator is continuously connected via the first input member 24-1 to the node A, which is specifically shown as the sun gear member 236-1. The node B, which is specifically shown as the carrier member 236-2, is continuously connected to the node D, which is specifically shown as the sun gear member 238-1. The node C, which is specifically shown as the ring gear member 236-3, is selectively connected to the node F, which is specifically shown as the ring gear member 238-3, via the second torque-transmitting device 42-2. The ring gear member 238-3 at the node F is also selectively connected via the first torque-transmitting device 42-1 to the transmission housing 40. The second power source 16, which is shown as an internal combustion engine, is continuously connected via the second input member 24-2 and the torsional damper 25 to the ring gear member 236-3 at the node C. The node C is also selectively connected via the third torque-transmitting device 42-3 to the node A. The node E, which is specifically shown as the carrier member 238-2, is continuously connected to the final drive assembly 23 via the transmission output member 26 and through the torque transfer mechanism 23A. The node F', which is specifically shown as the ring gear member 238-3', is selectively connected to the transmission housing 40 via the eighth torque-transmitting device 42-8.

Figure 9A:
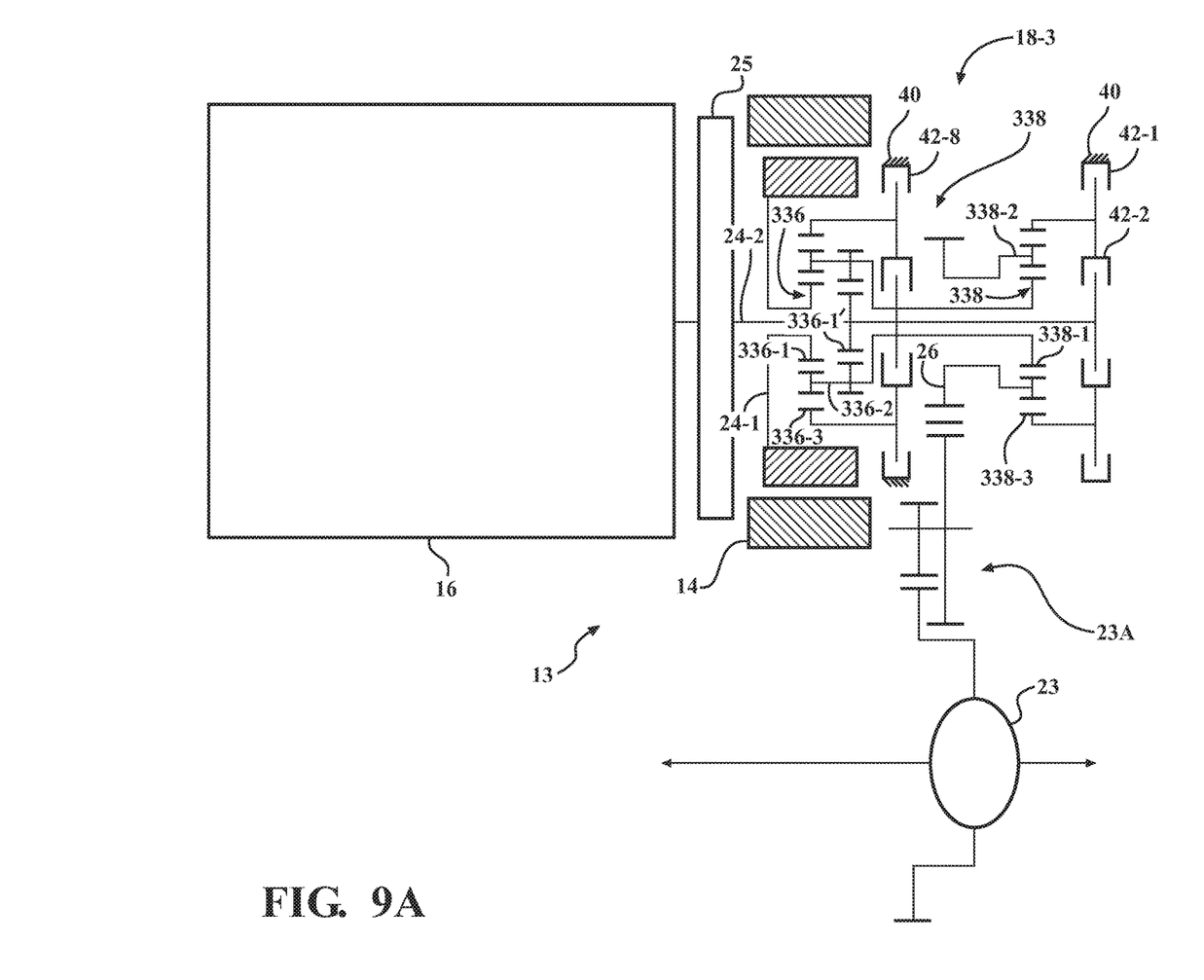
FIG. 9A is an exemplary schematic stick diagram illustration of the powertrain corresponding to the lever diagram of FIG. 9.

In FIG. 9A, the powertrain 13 is represented by a schematic stick diagram that depicts specific planetary gear-set connections corresponding to and reflected by the lever diagram of FIG. 9. The exemplary embodiment of the transmission assembly 18 represented by the lever diagram in FIG. 9 is identified in FIG. 9A with a numeral 18-3. The transmission assembly embodiment 18-3 has a specific embodiment of the Ravigneaux first planetary gear-set 36, identified with a numeral 336, and a specific embodiment of the second planetary gear-set 38, identified with a numeral 338. The first planetary gear-set 336 employs a sun gear member 336-1 which is circumscribed by a first ring gear member 336-3. The first planetary gear-set 336 also employs a second sun gear member 336-1' and a carrier member 336-2 rotatably supporting two sets of pinion gears. One of the sets of pinion gears meshingly engages the first sun gear member 336-1 and the first ring gear member 336-3, while the other set of pinion gears meshingly engages the second sun gear member 336-1'. The second planetary gear-set 338 employs a sun gear member 338-1 which is circumscribed by a ring gear member 338-3, and a carrier member 338-2 rotatably supporting a set of pinion gears. The set of pinion gears meshingly engages the sun gear member 338-1 and the ring gear member 338-3.

The exemplary transmission assembly embodiment 18-3 is configured such that the first power source 14, which is shown as an electric motor-generator is continuously connected via the first input member 24-1 to the node A, which is specifically shown as the first sun gear member 336-1. The node B, which is specifically shown as the carrier member 336-2, is continuously connected to the node D, which is specifically shown as the sun gear member 338-1. The node A', which is specifically shown as the second sun gear member 336-1', is selectively connected to the node F, which is specifically shown as the ring gear member 338-3, via the second torque-transmitting device 42-2. The node C, which is specifically shown as the ring gear member 336-3, is selectively connected to the carrier member 336-2 at node B via the seventh torque-transmitting device 42-7. The ring gear member 338-3 at the node F is also selectively connected via the eighth torque-transmitting device 42-8 to the transmission housing 40. The second power source 16, which is shown as an internal combustion engine, is continuously connected via the second input member 24-2 and a torsional damper 25 to the second sun gear member 336-1' at the node A'. The carrier member 336-2 at node B is continuously connected to the sun gear member 338-1 at the node D. The node E, which is specifically shown as a carrier member 338-2, is continuously connected to the final drive assembly 23 via the transmission output member 26 and through the torque transfer mechanism 23A.

Overall, each of the above embodiments of the powertrain 13 permits use of a single power source 14 coupled to the transmission assembly 18 employing a minimal number of gear sets and torque transmitting devices for powering the vehicle 10 at the first drive axle 12. A lock-up clutch is employed by the transmission assembly 18 to enable fixed gear operation therein. Additionally, the transmission assembly 18 may employ an input brake to permit electric propulsion of the vehicle 10 via the first power source 14, i.e., without torque input from the second power source 16. The disclosed embodiments of the transmission assembly 18 coupled with the first power source 14 and the second power source 16 provide a low-complexity, efficiently packaged powertrain for an electric or a hybrid-electric motor vehicle. Additionally, such embodiments of the powertrain 13 and the transmission 18 may be used either in front-wheel-drive or all-wheel drive vehicle configurations.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A powertrain for a motor vehicle, comprising:
    a first power source configured to generate a first torque output;
    a second power source configured to generate a second torque output; and
    a transmission assembly including:
        a first input member, a second input member, and an output member;
        a first planetary gear-set having a plurality of nodes and operatively connected to each of the first and second input members;

a second planetary gear-set having a plurality of nodes and operatively connected to the output member;
a transmission housing configured to retain the first and second planetary gear-sets;
a first torque-transmitting device configured to selectively connect one of the plurality of nodes of the second planetary gear-set to the transmission housing; and
a second torque-transmitting device configured to selectively connect one of the plurality of nodes of the first planetary gear-set to one of the plurality of nodes of the second planetary gear-set;
wherein:
one of the plurality of nodes of the first planetary gear-set is directly and continuously connected to one of the plurality of nodes of the second planetary gear-set;
each of the first power source and the second power source is operatively connected to the first planetary gear-set, and the first power source is operatively connected to the node of the first planetary gear-set that is not directly and continuously connected to one of the plurality of nodes of the second planetary gear-set; and
the transmission assembly also includes:
a fourth torque-transmitting device configured to selectively connect the second power source to the first planetary gear-set; and
a fifth torque-transmitting device configured to selectively connect the first power source to the directly and continuously connected nodes of the first planetary gear-set and the second planetary gear-set.

2. The powertrain according to claim 1, wherein the second torque-transmitting device is configured to selectively connect the second power source to the node of the second planetary gear-set selectively connected to the transmission housing via the first torque-transmitting device.

3. The powertrain according to claim 1, wherein the second power source is operatively connected to one of the plurality of nodes of the first planetary gear-set that is not directly and continuously connected to one of the plurality of nodes of the second planetary gear-set.

4. The powertrain according to claim 1, wherein the first and the second power sources are directly and continuously connected to separate nodes of the first planetary gear-set, and wherein the transmission assembly also includes a third torque-transmitting device configured to selectively connect two nodes of the first planetary gear-set individually and continuously connected to the respective first and the second power sources.

5. The powertrain according to claim 1, wherein the second planetary gear-set is configured as a Ravigneaux planetary gear-set, and wherein the transmission assembly also includes a sixth torque-transmitting device configured to selectively ground to the transmission housing a node of the Ravigneaux second planetary gear-set not selectively connected to the transmission housing by the first torque-transmitting device.

6. The powertrain according to claim 1, wherein the first planetary gear-set is configured as a Ravigneaux planetary gear-set, and wherein the transmission assembly also includes a seventh torque-transmitting device configured to selectively connect two separate nodes of the Ravigneaux first planetary gear-set not operatively connected to either the first power source or the second power source.

7. The powertrain according to claim 6, wherein the transmission assembly also includes an eighth torque-transmitting device configured to selectively ground to the transmission housing a node of the Ravigneaux first planetary gear-set not operatively connected to either the first power source or the second power source and not directly and continuously connected to one of the plurality of nodes of the second planetary gear-set.

8. The powertrain according to claim 1, wherein the motor vehicle is arranged along a longitudinal vehicle axis and includes a final drive assembly, and wherein each of the first power source, second power source, and the final drive assembly is arranged along the longitudinal vehicle axis or along respective axes arranged transverse to the longitudinal vehicle axis.

9. A motor vehicle comprising:
a first road wheel and a second road wheel;
a final drive assembly operatively connected to each of the first and second road wheels; and
a powertrain including:
a first power source configured to generate a first torque output;
a second power source configured to generate a second torque output; and
a transmission assembly including:
a first input member, a second input member, and an output member;
a first planetary gear-set having a plurality of nodes and operatively connected to each of the first and second transmission input members;
a second planetary gear-set having a plurality of nodes and operatively connected to the transmission output member;
a transmission housing configured to retain the first and second planetary gear-sets;
a first torque-transmitting device configured to selectively connect one of the plurality of nodes of the second planetary gear-set to the transmission housing; and
a second torque-transmitting device configured to selectively connect one of the plurality of nodes of the first planetary gear-set to one of the plurality of nodes of the second planetary gear-set;
wherein:
one of the plurality of nodes of the first planetary gear-set is directly and continuously connected to one of the plurality of nodes of the second planetary gear-set;
each of the first power source and the second power source is operatively connected to the first planetary gear-set, and the first power source is operatively connected to the node of the first planetary gear-set that is not directly and continuously connected to one of the plurality of nodes of the second planetary gear-set;
the output member is operatively connected to the final drive assembly; and
the transmission assembly also includes:
a fourth torque-transmitting device configured to selectively connect the second power source to the first planetary gear-set; and
a fifth torque-transmitting device configured to selectively connect the first power source to the directly and continuously connected nodes of the first planetary gear-set and the second planetary gear-set.

10. The motor vehicle according to claim 9, wherein the second torque-transmitting device is configured to selectively connect the second power source to the node of the second planetary gear-set selectively connected to the transmission housing via the first torque-transmitting device.

11. The motor vehicle according to claim 9, wherein the second power source is operatively connected to one of the plurality of nodes of the first planetary gear-set that is not directly and continuously connected to one of the plurality of nodes of the second planetary gear-set.

12. The motor vehicle according to claim 9, wherein the first and the second power sources are directly and continuously connected to separate nodes of the first planetary gear-set, and wherein the transmission assembly also includes a third torque-transmitting device configured to selectively connect two nodes of the first planetary gear-set individually and continuously connected to the respective first and the second power sources.

13. The motor vehicle according to claim 9, wherein the second planetary gear-set is configured as a Ravigneaux planetary gear-set, and wherein the transmission assembly also includes a sixth torque-transmitting device configured to selectively ground to the transmission housing a node of the Ravigneaux second planetary gear-set not selectively connected to the transmission housing by the first torque-transmitting device.

14. The motor vehicle according to claim 9, wherein the first planetary gear-set is configured as a Ravigneaux planetary gear-set, and wherein the transmission assembly also includes a seventh torque-transmitting device configured to selectively connect two separate nodes of the Ravigneaux first planetary gear-set not operatively connected to either the first power source or the second power source.

15. The motor vehicle according to claim 14, wherein the transmission assembly also includes an eighth torque-transmitting device configured to selectively ground to the transmission housing a node of the Ravigneaux first planetary gear-set not operatively connected to either the first power source or the second power source and not directly and continuously connected to one of the plurality of nodes of the second planetary gear-set.

16. The motor vehicle according to claim 9, further comprising a final drive assembly, wherein the motor vehicle is arranged along a longitudinal vehicle axis, and wherein each of the first power source, second power source, and the final drive assembly is arranged along the longitudinal vehicle axis or along respective axes arranged transverse to the longitudinal vehicle axis.

* * * * *